(12) United States Patent
Kotlowski et al.

(10) Patent No.: US 6,912,611 B2
(45) Date of Patent: Jun. 28, 2005

(54) SPLIT TRANSACTIONAL UNIDIRECTIONAL BUS ARCHITECTURE AND METHOD OF OPERATION

(75) Inventors: Kenneth James Kotlowski, Berthoud, CO (US); Brett A. Tischler, Longmont, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 603 days.

(21) Appl. No.: 09/845,504

(22) Filed: Apr. 30, 2001

(65) Prior Publication Data

US 2004/0225781 A1 Nov. 11, 2004

(51) Int. Cl.[7] .............................................. G06F 13/14
(52) U.S. Cl. ...................................... 710/305; 710/316
(58) Field of Search ........................ 710/100, 305–306, 710/316–317; 709/207, 225, 229, 232, 240

(56) References Cited

U.S. PATENT DOCUMENTS

| | | | |
|---|---|---|---|
| 4,429,405 A | * 1/1984 | Bux et al. | 375/335 |
| 4,965,828 A | * 10/1990 | Ergott et al. | 713/193 |
| 4,969,120 A | 11/1990 | Azevedo et al. | |
| 5,007,011 A | 4/1991 | Murayama | |
| 5,128,666 A | * 7/1992 | Munier et al. | 340/825.6 |
| 5,248,906 A | 9/1993 | Mahmood | |
| 5,412,786 A | 5/1995 | Kusano | |
| 5,477,174 A | * 12/1995 | Capener et al. | 327/131 |
| 5,528,172 A | 6/1996 | Sundstrom | |
| 5,539,739 A | 7/1996 | Dike et al. | |
| 5,577,102 A | * 11/1996 | Koivunen | 455/433 |
| 5,581,729 A | 12/1996 | Nishtala et al. | |
| 5,623,644 A | 4/1997 | Self et al. | |
| 5,634,043 A | 5/1997 | Self et al. | |
| 5,659,784 A | * 8/1997 | Inaba et al. | 710/200 |
| 5,694,586 A | * 12/1997 | Eneboe | 713/401 |
| 5,717,343 A | 2/1998 | Kwong | |
| 5,740,346 A | 4/1998 | Wicki et al. | |
| 5,812,875 A | * 9/1998 | Eneboe | 710/20 |
| 5,859,550 A | 1/1999 | Brandt | |
| 5,909,594 A | * 6/1999 | Ross et al. | 710/20 |
| 5,933,610 A | 8/1999 | Chambers et al. | |
| 5,991,824 A | 11/1999 | Strand et al. | |
| 5,996,037 A | 11/1999 | Emnett | |
| 6,145,039 A | 11/2000 | Ajanovic et al. | |
| 6,185,629 B1 | 2/2001 | Simpson et al. | |

(Continued)

FOREIGN PATENT DOCUMENTS

DE 19949144 C1 1/2001
JP 410285011 A 10/1998

OTHER PUBLICATIONS

Calder, B and Grunwald, D., "Fast and Accurate Instruction Fetch and Branch Prediction," Computer Architecture, Proceedings the 2nd Annual International Symposium on, 1 pp., Apr. 18–21, 1994.

(Continued)

Primary Examiner—Paul R. Meyers
(74) Attorney, Agent, or Firm—Toler, Larson & Abel, LLP (57) ABSTRACT

There is disclosed a bus interface unit for transferring data between a plurality of bus devices. The bus interface unit comprises: 1) a first bus device interface comprising: a) a first incoming request bus for receiving request packets from a first one of the plurality of bus devices; b) a first outgoing request bus for transmitting request packets to the first bus device; c) a first incoming data bus for receiving data packets from the first bus device; and d) a first outgoing data bus for transmitting data packets to the first bus device; and 2) a second bus device interface comprising: a) a second incoming request bus for receiving request packets from a second one of the plurality of bus devices; b) a second outgoing request bus for transmitting request packets to the second bus device; c) a second incoming data bus for receiving data packets from the second bus device; and d) a second outgoing data bus for transmitting data packets to the second bus device.

20 Claims, 3 Drawing Sheets

U.S. PATENT DOCUMENTS

| | | | |
|---|---|---|---|
| 6,205,524 B1 | 3/2001 | Ng | |
| 6,252,865 B1 | 6/2001 | Walton et al. | |
| 6,256,693 B1 | 7/2001 | Platko | |
| 6,282,195 B1 * | 8/2001 | Miller et al. | 370/392 |
| 6,292,025 B1 | 9/2001 | Okumura | |
| 6,333,654 B1 | 12/2001 | Harris et al. | |
| 6,335,935 B2 | 1/2002 | Kadambi et al. | |
| 6,353,867 B1 * | 3/2002 | Qureshi et al. | 710/305 |
| 6,415,361 B1 * | 7/2002 | Moh et al. | 711/141 |
| 6,415,424 B1 | 7/2002 | Arimilli et al. | |
| 6,418,497 B1 * | 7/2002 | Guthrie et al. | 710/264 |
| 6,504,817 B2 | 1/2003 | Oldfield et al. | |
| 6,553,446 B1 * | 4/2003 | Miller | 710/307 |
| 6,578,098 B1 | 6/2003 | Meiyappan et al. | |
| 6,581,116 B1 * | 6/2003 | Arimilli et al. | 710/110 |
| 6,584,101 B2 * | 6/2003 | Hagglund et al. | 370/389 |
| 2002/0053004 A1 * | 5/2002 | Pong | 711/119 |
| 2002/0110120 A1 | 8/2002 | Hagglund et al. | |
| 2002/0118041 A1 * | 8/2002 | Lapidus | 326/83 |
| 2002/0120878 A1 | 8/2002 | Lapidus | |
| 2002/0126693 A1 * | 9/2002 | Stark et al. | 370/463 |

OTHER PUBLICATIONS

John P. Uyemura, "CMOS Logic Circuit Design," Kluwer Academic Publishers, Boston, MA; ISBN 0–7923–8452–0, pp. 144 & 145, 2001.

Wee–Seng Soh and Kim, H.S., "Dynamic bandwidth reservation in hierarchical wireless ATM networks using GPS-based prediction," IEEE VTS 50th Vehicular Technology Conference, Amsterdam, Netherlands, on pp. 428–432 vol. 1, [online] Retrieved from IEEE Xplore, Abstract, 2 pages, Sep. 19, 1999.

Polze, A. et al., "Predictable Network Computing," Proceedings of the 17th International Conference on Distributed Computing Systems, Baltimore, MD, on pp. 423–431, [online] Retrieved from IEEE Xplore, Abstract, 2 pages, May 27, 1997.

* cited by examiner

SPLIT TRANSACTIONAL UNIDIRECTIONAL BUS ARCHITECTURE AND METHOD OF OPERATION

CROSS-REFERENCE TO RELATED APPLICATIONS

The present invention is related to those disclosed in the following United States Patent Applications:

Ser. No. 09/796,328, filed on Feb. 28, 2001, entitled "INTEGRATED CIRCUIT HAVING PROGRAMMABLE VOTAGE LEVEL LINE DRIVERS AND METHOD OF OPERATION";

Ser. No. 09/796,660, filed on Feb. 28, 2001, entitled "REDUCED NOISE LINE DRIVERS AND METHOD OF OPERATION";

Ser. No. 09/845,455, filed concurrently herewith, entitled "BUS ARBITRATOR SUPPORTING MULTIPLE ISOCHRONOUS STREAM IN A SPLIT TRANSACTIONAL UNIDIRECTIONAL BUS ARCHITECTURE AND METHOD OF OPERATION" (now U.S. Pat. No. 6,813,673).

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to system-on-a-chip (SOC) devices and other large integrated circuits (ICs) and, in particular, to a high-throughput bus architecture for use in a SOC device or other large integrated circuit (IC).

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. A SOC device integrates into a single chip many of the components of a complex electronic system, such as a wireless receiver (i.e., cell phone, a television receiver, and the like). SOC devices greatly reduce the size, cost, and power consumption of the system.

However, SOC designs are pushing the limits of existing interconnect topologies and diagnostic capabilities. Many SOC 2C devices, including microprocessors, use a variety of shared tri-state buses (e.g., XBus, fast XBus, PCI, and fast PCI). Currently there are no standard bus topologies and no easy way to mix and match designs for quick integration. In addition, with no consistent bus model, there are no consistent debugging, power management, or validation standards. The existing bus topologies are not scalable and do not support the demanding needs for higher bandwidth, isochronous data, and scalable peripherals.

These problems stem, in part from the lack of a standard interconnect for high-performance devices, such as the central processing unit (CPU) or processor core, 2D/3D graphics blocks, MPEG decoding blocks, 1394 bus controller, and the like. As device requirements exceed existing bus capabilities, either new derivative buses are created or non-Universal Memory Architecture (non-UMA) solutions are used. These ad-hoc non-standard interfaces preclude the reuse of technology improvements between products.

Another weakness in current bus topologies is the lack of a generalized UMA interface. Allowing multiple devices to use the same unified memory reduces system cost. However, the UMA devices must not adversely effect the Processor access latency. Another limitation in many data processing devices is the chip-to-chip peripheral component interface (PCI) bus. Using a chip-to-chip PCI bus limits bandwidth and the possibility of implementing chip-to-chip UMA devices.

Existing bus architectures do not support technology reuse as memory bandwidth increases with new memory speeds and technologies (e.g., SDRAM-166). A new bus standard must support bandwidth matching between older, lower bandwidth devices and newer, higher bandwidth devices. In addition to bandwidth matching, clock matching must be addressed when mixing bus architectures.

New input/output (I/O) standards, such as 1394 and USB, create real-time isochronous data streams which need guaranteed bandwidths and latencies. Most bus topologies do not adequately support these isochronous requirements. Mixing isochronous data, low latency access, and high-bandwidth UMA peripherals requires a new full-featured bus topology.

Peer-to-peer communication is optimal for data streams such as VIP, 1394 and MPEG transport layer. Using peer-to-peer, memory and CPU interactions can be avoided. In addition, data traffic between the CPU and a graphics rendering block requires high bandwidth peer-to-peer communication. A new interconnect bus topology must provide common test strategies, power management, diagnostic and clocking interfaces to address design reuse. Also, a new bus topology must address reuse of legacy bus technologies. It is unreasonable to expect device manufacturers to re-code existing devices to conform to a new standard. Existing PCI and XBus blocks must be able to fit in the new topology with minimal modification.

Therefore, there is a need in the art for an improved bus architecture for system-on-a-chip (SOC) devices and other large scale integrated circuits. In particular, there is a need for a bus architecture that supports bandwidth matching between older, lower bandwidth devices and newer, higher bandwidth devices. More particularly, there is a need for a bus architecture that is capable of handling isochronous data with low latency access and that can communicate with UMA peripherals.

SUMMARY OF THE INVENTION

To address the above-discussed deficiencies of the prior art, it is a primary object of the present invention to provide a bus interface unit for transferring data between a plurality of bus devices. According to an advantageous embodiment of the present invention, the bus interface unit comprises: 1) a first bus device interface comprising: a) a first incoming request bus for receiving request packets from a first one of the plurality of bus devices; b) a first outgoing request bus for transmitting request packets to the first bus device; c) a first incoming data bus for receiving data packets from the first bus device; and d) a first outgoing data bus for transmitting data packets to the first bus device; and 2) a second bus device interface comprising: a) a second incoming request bus for receiving request packets from a second one of the is plurality of bus devices; b) a second outgoing request bus for transmitting request packets to the second bus device; c) a second incoming data bus for receiving data packets from the second bus device; and d) a second outgoing data bus for transmitting data packets to the second bus device.

According to one embodiment of the present invention, a first one of the request packets received on the first incoming request bus comprises a physical address field and a request type field.

According to another embodiment of the present invention, the first request packet further comprises a priority field.

According to still another embodiment of the present invention, the request type field comprises a write data indicator indicating that the first request packet is a first write data request operable to transfer a first data block stored in the first bus device to the second bus device.

According to yet another embodiment of the present invention, a first one of the data packets received on the first incoming data bus is associated with the first write data request.

According to a further embodiment of the present invention, the request type field comprises a read data indicator indicating that the first request packet is a first read data request operable to transfer a second data block stored in the second bus device to the first bus device.

According to a still further embodiment of the present invention, a first one of the request packets received on the first incoming request bus comprises a source identification value identifying an initiating bus device that initiated the first request packet.

According to a yet further embodiment of the present invention, the first request packet comprises a destination identification value identifying a recipient bus device to which the first request packet is being transmitted.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processing system.

Figure 1:
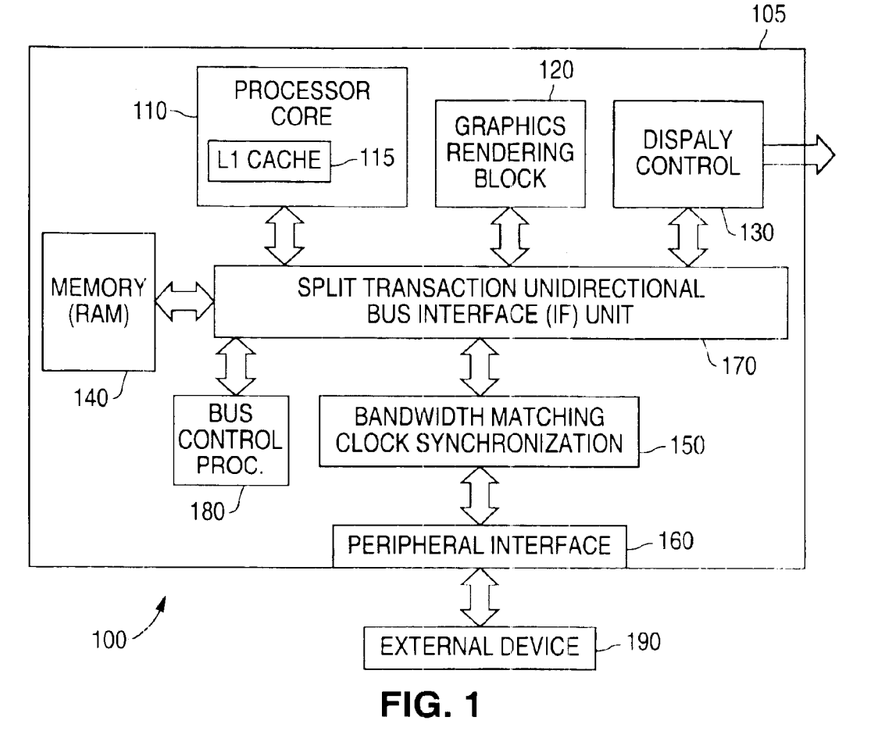
FIG. 1 illustrates a data processing system that comprises an exemplary system-on-a-chip (SOC) device according to one embodiment of the present invention.

FIG. 1 illustrates processing system 100, which comprises exemplary system-on-a-chip (SOC) device 105 according to one embodiment of the present invention. SOC device 105 is a single integrated circuit comprising processor core 110, graphics rendering block 120, (optional) display control circuit 130, memory 140, bandwidth matching-clock synchronization interface 150, is peripheral interface 160, split transaction, unidirectional bus interface (IF) unit 170 (or bus IF unit 170), and bus control processor 180. Optionally, processor core 110 may contain internal level one (L1) cache 115. Peripheral interface 160 communicates with external device 190.

Processing system 100 is shown in a general level of detail because it is intended to represent any one of a wide variety of electronic products, particularly consumer appliances. Display controller 130 is described above as optional because not all end-products require the use of a display. Likewise, graphics rendering block 120 may also be optional.

For example, processing system 100 may be a printer rendering system for use in a conventional laser printer. Processing system 100 also may represent selected portions of the video and audio compression-decompression circuitry of a video playback system, such as a video cassette recorder or a digital versatile disk (DVD) player. In another alternative embodiment, processing system 100 may comprise selected portions of a cable television set-top box or a stereo receiver.

Bus IF unit 170 provides high-speed, low latency communication paths between the components coupled to bus IF unit 170. Each component coupled to bus IF unit 170 is capable of initiating or servicing data requests via four unidirectional bus interfaces: two request buses and a two data buses. The request bus contains address lines, byte enable lines (32-bit or 64-bit data reads), cycle type lines, and routing information for transactions. The data bus contains data lines, byte enable lines (for data writes), completion status lines, and routing information to associate the data bus packets with the appropriate request bus packet. As noted, the four buses are unidirectional and point-to-point to minimize loading and timing variations. In addition, bus IF unit 170 provides a diagnostic bus, power management controls, clocks, reset signals, and a scan interface.

Bus IF unit 170 implements a transaction protocol that defines the mechanism for transferring packets between devices coupled to bus IF unit 170. In addition, the transaction protocol defines the control for clocks and power management. The packet protocol standardizes the system level interactions between devices coupled to bus IF unit 170. The hardware requirements for translating addresses, arbitrating packets, and maintaining coherency is specified in the packet protocol.

Bandwidth matching-clock synchronization interface 150 comprise a queue that bridges ports on bus IF unit 170 that have different widths or different frequencies, or both. Bus control processor 180 controls certain operations of bus IF unit 170 related to clock timing, power management, and diagnostic features. Peripheral interface 160 is a bus device used for chip-to-chip communication between SOC device 105 and an external peripheral device, such as external device 190.

Figure 2:
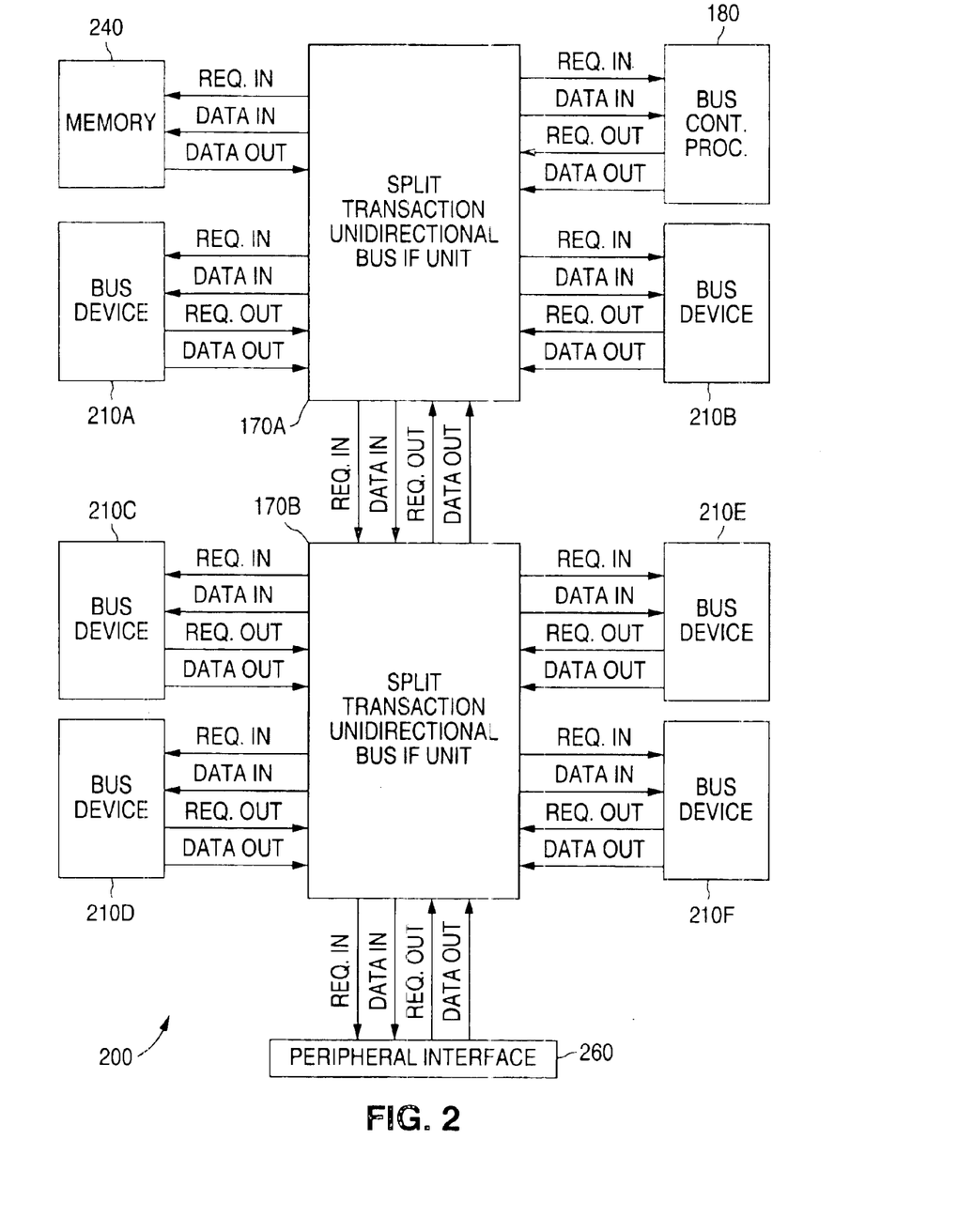
FIG. 2 illustrates a high-level signal interface of the interconnection of exemplary split transaction, unidirectional bus interface (IF) unit and other bus devices in FIG. 1 according to the principles of the present invention.

FIG. 2 illustrates high-level signal interface 200, which defines the interconnection of an exemplary split transaction, unidirectional bus interface (IF) unit and other bus devices in FIG. 1 according to the principles of the present invention. In the illustrative embodiment, a first split transaction, unidirectional bus interface unit (i.e., bus IF unit 170A) is coupled to, and transfers data between, memory 240, bus control processor 180, bus device 210A, bus device 210B, and a second split transaction, unidirectional bus interface unit (i.e., bus IF unit 170B). Bus IF unit 170B is coupled to, and transfers data between, bus devices 210C–210F, peripheral interface 260, and bus IF unit 170A.

In the illustrative embodiment, bus IF unit 170A uses separate interfaces to transfer data with bus device 210A, bus device 210B, bus control processor 180, and bus IF unit 170B. Each of the separate interfaces comprises four unidirectional buses. The unidirectional buses in each interface are REQUEST OUT, REQUEST IN (abbreviated REQ. CUT and REQ. IN, respectively), DATA OUT, and DATA IN. Similarly, bus IF unit 170B uses separate interfaces to transfer data with bus devices 210C–210F, peripheral interface 260, and bus IF unit 10A.

A data read request from a requesting one of bus devices 210A–210F is transmitted from bus IF unit 170A or bus IF unit 170B to a receiving one of bus devices 210A–210F that has the requested data via one of the REQUEST IN buses. The requested data is then transmitted out on the corresponding DATA OUT bus and received by the requesting device on its DATA IN bus. Similarly, a write request from a requesting one of bus devices 210A–210F is transmitted from bus IF unit 170A or bus IF unit 170B to a receiving one of bus devices 210A–210F to which the data is to be written via one of the REQUEST IN buses. The incoming data is then received on the corresponding DATA IN bus. A requesting one of bus devices 210A–210F transmits read and write requests on the REQUEST OUT bus.

For example, bus device 210A may write data to bus device 210B by first transmitting to bus IF unit 170A a write data request on the REQUEST OUT bus coupling bus device 210A and bus IF unit 170A. Bus device 210A also transmits the write data (i.e., data being written) to bus IF unit 170A on the DATA OUT bus coupling bus is device 210A and bus IF unit 170A. Next, bus IF unit 170A transmits the write data request to bus device 210B on the REQUEST IN bus coupling bus device 210B and bus IF unit 170A. Bus IF unit 170A also transmits the write data to bus device 210B on the DATA IN bus coupling bus device 210B and bus IF unit 170A.

Furthermore, a bus device coupled to bus IF unit 170A can read data from, or write data to, a bus device coupled to bus IF unit 1703 (including peripheral interface 260) via the four bus interface connecting bus IF unit 170A and bus IF unit 170B. Similarly, a bus device coupled to bus IF unit 170B (including peripheral interface 260) can read data from, or write data to, a bus device coupled to bus IF unit 170A via the four bus interface connecting bus IF unit 170A and bus IF unit 170B.

In the exemplary embodiment in FIG. 2, bus IF unit 170A is coupled to memory 240 by only three buses, namely the REQUEST IN bus, the DATA OUT bus, and the DATA IN bus. A REQUEST OUT bus is not used to couple bus IF unit 170A and memory 240 because memory 240 does not normally initiate read operations and write operations.

Figure 3:
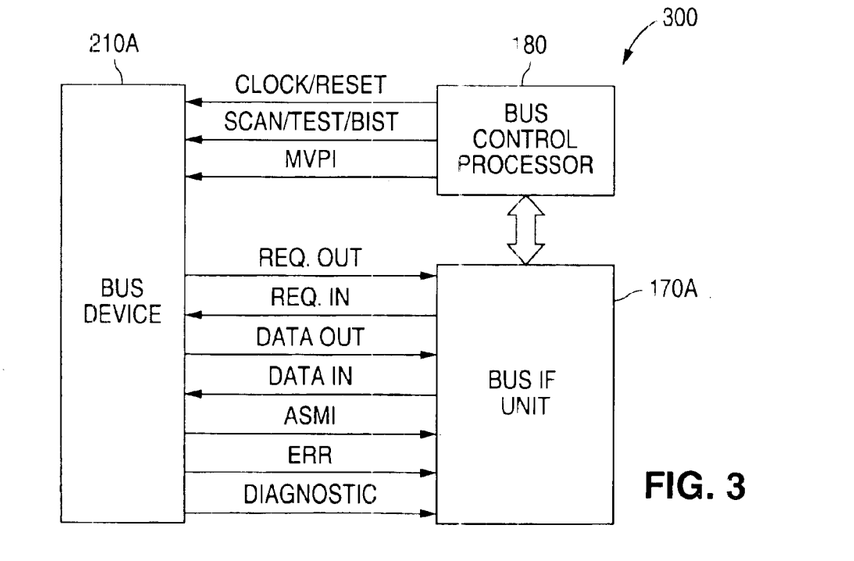
FIG. 3 illustrates the signal interface which defines the interconnection of the exemplary bus IF unit, bus control is processor, and one bus device in FIG. 2 in greater detail according to one embodiment of the present invention.

FIG. 3 illustrates in greater detail exemplary signal interface 300, which defines the interconnection of bus IF unit 170A, bus control processor 180, and bus device 210A according to one embodiment of the present invention. As before, bus IF unit 170A is coupled to bus device 210A by four independent buses (REQUEST OUT, REQUEST IN, DATA OUT, and DATA IN). Bus IF unit 170A also is coupled to bus device 210A by several control signal lines, namely ASMI, ERR, and DIAGNOSTIC. Each port has an independent interface. Thus, there are no tri-state signal lines.

Bus device 210A initiates requests on the REQUEST OUT bus when bus device 210A operates as a master and receives requests on the REQUEST IN bus when bus device 210A operates as a slave. Write data and responses are initiated on the DATA OUT bus and transmitted to the target bus device (master or slave) on the DATA IN bus. All of the buses have a similar control interface. The data bus width (e.g., 16 bits, 32 bits, etc.) may vary based on the bandwidth desired for a given application. The asynchronous system management interrupt (ASMI) signal provides a mechanism for bus device 210A to request a system management interrupt. The error (ERR) signal indicates an error that is not associated with a particular bus transfer.

Bus device 210A receives clock and reset (CLOCK/RESET) signals from bus control processor 180. Bus control processor 180 also provides control signals for performing scan, test, and/or built-in self test (BIST) functions. Optionally, bus device 210A may provide a DIAGNOSTIC bus that is coupled to bus IF unit 170A. The DIAGNOSTIC bus is a group of important internal signals selected by the module designer. The DIAGNOSTIC bus may be multiplexed with diagnostic buses from other bus devices in bus IF unit 170A.

Request Bus Arbitration—The bus IF unit 170 arbitration scheme provides controlled latencies for real-time and isochronous data streams while maintaining optimal memory controller efficiency. The arbitration uses priority levels, time-slicing and round robin arbitration to meet these goals. The arbitration unit performs a series of tests until one possible request is remaining. In an advantageous embodiment of the present invention, bus IF unit 170 arbitrates one request/cycle. There is no arbitration overhead when switching between master bus devices 210. Therefore, if a graphics request is arbitrated, the next cycle can be arbitrated to the CPU. Specifically, the order of arbitration tests is as follows:

1) source/destination ready;
2) data coherency ordering rules;
3) time slice (isochronous data);
4) priority;
5) back-to-back requests; and
6) round-robin.

Source/Destination Ready Test—For each possible master bus device 210, if master bus device 210 has a request and the destination of the request is available, then the request may be arbitrated.

Data Coherency ordering Rules Test—The number of outstanding transactions and the current slave bus device 210 for each possible master bus device 210 are checked to prevent ordering hazards. If the request satisfies all the ordering checks, then it may be arbitrated.

Time Slice Arbitration Test—Time slice arbitration allows low-bandwidth isochronous devices to obtain service at fixed time intervals. Bus devices 210 are not required to use time slice arbitration. The mechanism is based on a "time slice wheel," which is a free-running rollover counter. Each bus device 210 that is participating in the time-slice arbitration scheme is assigned a time-slice of counter values. If multiple bus devices in the system require time-slice arbitration, bus devices can be assigned to different time slices to avoid conflicts.

The time slice wheel guarantees an arbitration slot for bus devices 210 requesting at the time-slice priority level 4 (highest priority level). If master bus device 210 issues a request and i) the source identification (SID) for master bus device 210 is assigned to the current time-slice and ii) master bus device 210 has not had a request acknowledged during the time-slice, then master bus device 210 is guaranteed to win the arbitration. If slave bus device 210 is not ready, it is guaranteed to be ready at least once during the period of the time slice. If master bus device 210 changes flow to a different slave bus device 210, then the request can be stalled and isochronous/real-time data streams cannot be guaranteed.

The time slice wheels between multiple bus IF units 170 must be programmed in a consistent manner. The time slice wheels in all of bus IF units 170 are synchronized.

Priority Test—The master bus devices with the highest priority level (0–3) may be arbitrated.

Round Robin Test—Arbitration fairness within a priority level is maintained using round robin arbitration to allow all devices fair access to the memory or other slave devices.

Data Bus Arbitration—Read response and write response packets are prioritized above write data packets. If there are multiple response packets or write data packets, then priority is based on port order. The lower number ports are prioritized above the higher number ports. Since Port 1 is the lowest available port number (Port 0 is a register within bus IF unit 170), data on Port 1 is never denied arbitration. Therefore, a bus device on Port 1 does not need response buffers in case a response data packet is not arbitrated.

Slave bus devices 210 that are capable of queuing multiple requests must contain a mechanism to elevate the priority of queued requests. This mechanism looks at the priority field of incoming requests. Slave bus device 210 determines a unique master bus device 210 from the combination of the device source identification (SID) and the device priority domain identification (PID) fields. The slave bus device compares the SID and PID fields to the requests in its queue. If the slave bus device finds a match on both of these fields and the priority field of the incoming request is higher than the priority fields of the matching requests in the queue, the priority of the requests in the queue are set to the value of the priority of the incoming packet. This ensures that the transactions from a given master bus device complete in order.

If a master bus device wishes to elevate the priority of previously sent (pending) requests but is unable to begin a new transaction, the master bus device may issue a null request at the higher priority level. Bus IF unit 170 then routes the null-request packet to the same slave bus device as the previous request from that master bus device. Upon receipt of a null request, a slave bus device updates the priority of queued transactions as described above and then discards the null request packet. Slave bus devices do not send a data packet in response to a null request. A bus device cannot elevate its priority to level 4, which is the time slice priority.

The CPU interface may implement a watchdog timer to ensure that it is able to receive service in the system in case of a catastrophic error or hardware malfunction. The watchdog timer increments during each clock in which the CPU has a pending transaction. It resets each time the CPU receives a response to a previously issued request. If the timer expires, the CPU elevates its priority level to highest priority to guarantee completion. This allows the CPU some portion of bus bandwidth, even if an errant device is consuming a high amount of bus bandwidth at the highest priority level. Optionally, other bus devices in the system may be permitted to implement a watchdog timer.

Figure 4:
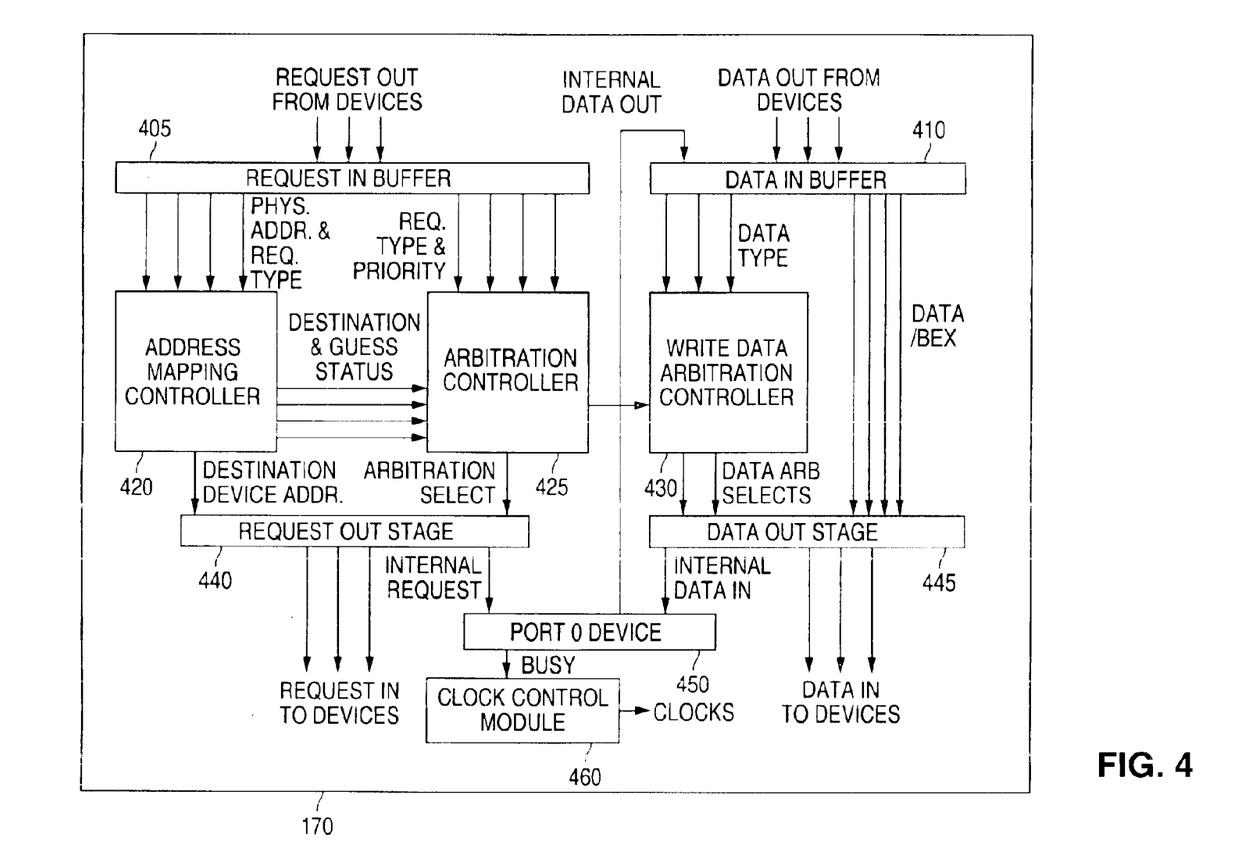
FIG. 4 illustrates one part of an exemplary split transaction, unidirectional bus interface (IF) unit in greater detail according to the principles of the present invention.

FIG. 4 illustrates in greater detail exemplary split transaction, unidirectional bus interface (IF) unit 170 (bus IF unit 170) according to the principles of the present invention. Bus IF unit 170 comprises request-in buffer 405, data-in buffer 410, address mapping controller 420, arbitration controller 425, write data arbitration controller 430, request-out stage 440, data-out stage 445, Port 0 device 450, and clock control module 460.

Request-In Buffer 405—Request-in buffer 405 receives incoming requests from bus devices 210. In one embodiment of the present invention, a one-clock turnaround is present before the request-in buffer 405 acknowledges acceptance of the request packet. In order to operate with this one-clock delay, the request-in buffer 405 uses a 1-entry buffer for each master bus device port. Request-in buffer 405 manages this buffer and places either the incoming request or the buffered request on the internal request bus. The internal request bus has all of the packet fields parsed (e.g., request type, physical address, priority). In addition, the request-in buffer 405 replaces the incoming SID with the actual port number of the device. The request-in buffer 405 sends the physical address and request type fields to address mapping controller 420 and the request type and priority fields to arbitration controller 425. The other fields are forwarded to request-out stage 440 module. Request-in buffer 405 also implements a port active enable signal to limit the request activity of each port. The port active enable signal is used to prevent a bus device from performing any transactions during configuration and limiting the priority and number of outstanding is requests from misbehaving bus devices. In addition, if the bridge feature is enabled for the port, registered inputs are implemented. This provides a full cycle when crossing bus IF units 170. This is important for timing purposes because two bus IF units 170 that are coupled together may be disposed remotely from one another. If the bridge feature is not enabled for the port, the inputs are combinatorial.

Address Mapping Controller 420—Address mapping controller 420 performs address mapping and determines the destination bus device for a given transaction. Address mapping controller 420 module performs this mapping for all ports in parallel. In addition, address mapping controller 420 translates received physical memory addresses to local memory addresses within the corresponding bus device. Address mapping controller 420 translates and routes memory request, I/O requests, and machine specific register (MSR) requests differently.

Address mapping controller 420 performs speculative address mapping. To do this, address mapping controller 420 uses the descriptor of the last access for each port as a guess for the incoming request. If address mapping controller 420 guesses incorrectly, the guess is updated and in the next cycle the address is mapped correctly. The speculative mapping is correct about 99% of the time and allows address mapping controller 420 to perform mapping in parallel with arbitration. Advantageously, the pipeline depth is reduced from two stages to one.

Arbitration Controller 425—Arbitration controller 425 arbitrates all request packets for bus IF unit 170. Arbitration controller 425 receives the destination, transaction type and priority of each port request. In addition, arbitration controller 425 receives inputs from write data arbitration controller 430 in order to monitor the number of outstanding write data and responses. The primary outputs of arbitration controller 425 are a plurality of Arbitration Select signals. These signals notify request-out stage 440 which port has been arbitrated. Arbitration controller 425 can arbitrate one request per clock cycle.

Arbitration controller 425 performs a series of pre-arbitration checks to determine if a request from a port is a candidate for arbitration. The following pre-arbitration checks are performed:

1) Not ready check—This check determines if the port has a valid request and if its destination request output buffer is available.

2) Priority check—This check determines if the priority level of the port request is equal to the maximum priority level of all the ports.

3) Isochronous (ISOC) check—This check determines if the priority level is time-slice and whether this port is the SID of current time-slice.

4) Change of flow check—If the destination of the port request is not the current destination of the port, this check determines if there are any outstanding transaction on the data buses.

The vector of all the pre-arbitrated requests are then round-robin arbitrated. If there is an isochronous request (priority level (PRI)=4) and the port SID is not the current time-slice, the request is internally changed into a PRI=3 request. If there is an isochronous request, arbitration controller 425 prevents multiple isochronous requests from being arbitrated during that time-slice.

Arbitration by arbitration controller 425 is contingent on guessing for the destination and address mapping performed by address mapping controller 420. If a guess is not correct for the arbitrated port, the arbitration is killed and a dead cycle occurs. The guess is corrected for the next cycle and the arbitration is allowed to occur.

Arbitration controller 425 uses master requests on Port 0 device 450 to arbitrate the internally buffered coherent requests. Arbitration controller 425 maintains an arbitration machine specific register (ARB MSR) to control the arbitration algorithm. These controls can be used for debug purposes and to control the bandwidth allocations for isochronous devices. Arbitration controller 425 sends write data arbitration controller 430 a bus request describing the request arbitration. This includes the SID, DID (destination ID), type and size of the arbitrated transaction.

Request-Out Stage 440—Request-out stage 440 takes in all the incoming requests and multiplexes the requests to create the output request. The multiplexing is driven by Arbitration Select signals from arbitration controller 425. Request-out stage 440 manages the output buffers for each output port. If a buffer is available or will be available in the next cycle, request-out stage 440 asserts the take signal to arbitration controller 425 to allow arbitration to the port.

Data-In Buffer 410—Data-in buffer 410 buffers the incoming Data In packets. In one embodiment of the present invention, there is a one clock delay between the transmission of a packet and the acknowledgment of its receipt. To operate with this delay, Data-In Buffer 410 provides and manages a one-deep buffer for each data-in port.

Data-in buffer 410 replaces the SID field on write data packets with the actual port ID. In addition, data-in buffer 410 replaces the destination identification (DID) field on response packets. In addition, if the bridge feature is enabled for the port, registered inputs are implemented. This provides a full cycle when crossing bus IF units 170. If the bridge feature is not enabled for the port, the inputs are combinatorial. If the bridge feature is enabled for a port, data-in buffer 410 must perform SID remapping. Data-in buffer 410 maintains a list and count of all outstanding transaction responses and the corresponding SID and PID fields. When a response appears on data-in buffer 410, the SID field is determined by SID=f(PID, DATATYPE), where the returned SID field is the SID field of the oldest outstanding transaction with that PID and DATATYPE field.

Write Data Arbitration Controller 430—Write data arbitration controller 430 arbitrates all bus IF unit 170 write data packets and response packets. According to an advantageous embodiment of the present invention, write data arbitration controller 430 may arbitrate up to two packets per clock cycle. Write data arbitration controller 430 maintains counters for arbitrated non-coherent write data, coherent write data and responses. The zero is values of these courters are used to determine when a master bus device 210 may change flow and to prevent acceptance of premature data. Write data arbitration controller 430 receives the arbitrated packets from arbitration controller 425 describing the SID field, DID field, size and type of each arbitrated request.

Write data arbitration controller 430 receives the data type from data-in buffer 410. The destination of the packets is determined by the current write destination register in write data arbitration controller 430 for write data or the packet SID for response packets. The requests are pre-arbitrated to determine which packets are candidates for arbitration. Write data arbitration controller 430 performs a check to determine if a packet is a write data packet and if the write data buffer for its destination port is available. Write data arbitration controller 430 also performs a check to determine if a packet is a response packet. The pre-arbitrated packets are then priority arbitrated starting at Port 1. The first packet is arbitrated based on the priority encoding of the pre-arbitrated requests. The send packet is arbitrated based on a priority encoding of all the requests besides the first arbitrated port. The primary outputs of the write data arbitration controller 430 are Data Arbitration Select signals.

Data-Out Stage 445—Data-out stage 445 receives all incoming data packets and the Data Arbitration Select signals from write data arbitration controller 430. Data-out stage 445 then multiplexes the results to two internal output buses. These two buses are then routed to each of the output buffers for each port. Each port manages a skid buffer and the actual output buffer. The skid buffer allows data-out stage 445 to place response data on the bus when write data is stalled at the output port.

Port 0 device 450—Port 0 device 450 is the bus device on Port 0. Port 0 device 450 implements the bus IF unit 170 master/slave protocol and accepts all Port 0 requests and transactions. Port 0 device 450 accepts the following request types:

1) MSR Write—Routes machine specific register (MSR) requests to an internal MSR for bus IF unit 170;

2) MSR Read—Reads internal MSRs for bus IF unit 170;

3) Other valid types—Responds with the correct number of packets and may assert SSMI or SERR.

Port 0 device 450 sends an internal decoded MSR read and MSR write bus to all the modules in bus IF unit 170.

In addition, Port 0 device 450 watches the activity of all the modules in bus IF unit 170 and implements the power management control logic and MSRs. Port 0 device 450 sends Busy Early and Bus Late signals to clock control module 460. Port 0 device 450 module also internally buffers coherent requests. When Port 0 device 450 sees a coherent response (write-back or a clean snoop response), it promotes the coherent request into a PRI=7 request and masters the request on Port 0 to guarantee that it is arbitrated next and changes the type to a non-coherent transaction.

Port 0 device 450 also implements the debug features for bus IF unit 170. The transaction comparators assert the AERR signal when a transaction hits the comparators. If transactions are mastered from a port with the debug feature enabled, Port 0 device 450 masters debug transactions to echo the packets. Port 0 device 450 also implements the diagnostic bus for assertions of internal conditions.

Clock Control Module 460—Clock control module 460 is a shared common module that performs the clock gating control for bus IF unit 170. Clock control module 460 receives the Busy Early and Busy Late signals from Port 0 device 450 and the power management MSRs of bus IF unit 170 and controls the clock gating.

Although the present invention has been described in detail, those skilled in the art should understand that they can make various changes, substitutions and alterations herein without departing from the spirit and scope of the invention in its broadest form.

What is claimed is:

1. A bus interface unit for transferring data between a plurality of bus devices, said bus interface unit comprising:
    a first bus device interface comprising:
        a first incoming request bus for receiving one or more request packets from a first one of said plurality of bus devices;
        a first outgoing request bus for transmitting one or more request packets to said first bus device;
        a first incoming data bus for receiving one or more data packets from said first bus device; and
        a first outgoing data bus for transmitting one or more data packets to said first bus device; and
    a second bus device interface comprising:
        a second incoming request bus for receiving one or more request packets from a second one of said plurality of bus devices;
        a second outgoing request bus for transmitting one or more request packets to said second bus device;
        a second incoming data bus for receiving one or more data packets from said second bus device; and
        a second outgoing data bus for transmitting one or more data packets to said second bus device.

2. The bus interface unit as set forth in claim 1 wherein a first one of said one or more request packets received on said first incoming request bus comprises a physical address field and a request type field.

3. The bus interface unit as set forth in claim 2 wherein said first request packet further comprises a priority field.

4. The bus interface unit as set forth in claim 3 wherein said request type field comprises a write data indicator indicating that said first request packet is a first write data request operable to transfer a first data block stored in said first bus device to said second bus device.

5. The bus interface unit as set forth in claim 4 wherein a first one of said one or more data packets received on said first incoming data bus is associated with said first write data request.

6. The bus interface unit as set forth in claim 3 wherein said request type field comprises a read data indicator indicating that said first request packet is a first read data request operable to transfer a second data block stored in said second bus device to said first bus device.

7. The bus interface unit as set forth in claim 1 wherein a first one of said one or more request packets received on said first incoming request bus comprises a source identification value identifying an initiating bus device that initiated said first request packet.

8. The bus interface unit as set forth in claim 7 wherein said first request packet comprises a destination identification value identifying a recipient bus device to which said first request packet is being transmitted.

9. An integrated circuit comprising:
    N bus devices capable of transferring data with one another; and
    a bus interface unit for transferring data between said N bus devices, said bus interface unit comprising N bus interfaces, each of said N bus interfaces comprising:
        an incoming request bus for receiving one or more request packets from a first one of said plurality of bus devices;
        an outgoing request bus for transmitting one or more request packets to said first bus device;
        an incoming data bus for receiving one or more data packets from said first bus device; and
        an outgoing data bus for transmitting one or more data packets to said first bus device.

10. The integrated circuit as set forth in claim 9 wherein a first one of said one or more request packets received on said first incoming request bus comprises a physical address field and a request type field.

11. The integrated circuit as set forth in claim 10 wherein said first request packet further comprises a priority field.

12. The integrated circuit as set forth in claim 11 wherein said request type field comprises a write data indicator indicating that said first request packet is a first write data request operable to transfer a first data block stored in said first bus device to a second one of said plurality of bus devices.

13. The integrated circuit as set forth in claim 12 wherein a first one of said one or more data packets received on said first incoming data bus is associated with said first write data request.

14. The integrated circuit as set forth in claim 11 wherein said request type field comprises a read data indicator indicating that said first request packet is a first read data request operable to transfer a second data block stored in a second one of said plurality of bus devices to said first bus device.

15. The integrated circuit as set forth in claim 9 wherein a first one of said one or more request packets received on said first incoming request bus comprises a source identification value identifying an initiating bus device that initiated said first request packet.

16. The integrated circuit as set forth in claim 15 wherein said first request packet comprises a destination identification value identifying a recipient bus device to which said first request packet is being transmitted.

17. For use in a bus interface unit comprising N bus interfaces, each of the N bus interfaces comprising: i) an incoming request bus for receiving request packets; ii) an outgoing request bus for transmitting request packets; iii) an incoming data bus for receiving data packets; and iv) an outgoing data bus for transmitting data packets, a method of transferring data to a first bus device from a second bus device, the method comprising:

receiving a data read request packet from the first bus device on an incoming request bus coupled to the first bus device;

transmitting the data read request packet to the second bus device on an outgoing request bus coupled to the second bus device;

receiving a data packet from the second bus device on an incoming data bus coupled to the second bus device; and transmitting the data packet to the first bus device on an outgoing data bus coupled to the first bus device.

18. The method as set forth in claim 17 further comprising receiving an acknowledgment response packet from the second device on an incoming request bus coupled to the second bus device concurrently with receiving the data packet from the second bus device.

19. For use in a bus interface unit comprising N bus interfaces, each of the N bus interfaces comprising: i) an incoming request bus for receiving request packets; ii) an outgoing request bus for transmitting request packets; iii) an incoming data bus for receiving data packets; and iv) an outgoing data bus for transmitting data packets, a method of transferring data from a first bus device to a second bus device, the method comprising:

receiving a data write request packet from the first bus device on an incoming request bus coupled to the first bus device;

receiving a data packet from the first bus device on an incoming data bus coupled to the first bus device;

transmitting the data write request packet to the second bus device on an outgoing request bus coupled to the second bus device; and transmitting the data packet to the second bus device on an outgoing data bus coupled to the second bus device.

20. The method as set forth in claim 19 wherein the data write request packet and the data packet are received concurrently.

* * * * *